(12) United States Patent
Canonici

(10) Patent No.: US 11,817,942 B2
(45) Date of Patent: Nov. 14, 2023

(54) METHOD AND DEVICE FOR MODULATING WITH ZADOFF-CHU SEQUENCES

(71) Applicant: TERNWAVES, Cannes (FR)

(72) Inventor: Jean Canonici, Cannes (FR)

(73) Assignee: TERNWAVES, Cannes (FR)

( * ) Notice: Subject to any disclaimer, the term of this patent is extended or adjusted under 35 U.S.C. 154(b) by 48 days.

(21) Appl. No.: 17/433,637

(22) PCT Filed: Feb. 24, 2020

(86) PCT No.: PCT/FR2020/050345
§ 371 (c)(1),
(2) Date: Aug. 25, 2021

(87) PCT Pub. No.: WO2020/174167
PCT Pub. Date: Sep. 3, 2020

(65) Prior Publication Data
US 2022/0149966 A1    May 12, 2022

(30) Foreign Application Priority Data
Feb. 27, 2019   (FR) ...................................... 1902035

(51) Int. Cl.
*H04J 13/00*    (2011.01)
(52) U.S. Cl.
CPC ...... *H04J 13/0062* (2013.01); *H04J 13/0074* (2013.01)

(58) Field of Classification Search
None
See application file for complete search history.

(56) References Cited

U.S. PATENT DOCUMENTS

| 10,886,965 B2 | 1/2021 | Knopp et al. |
| 2009/0052427 A1* | 2/2009 | Oketani ................ H04L 5/0007 370/347 |
| 2012/0207118 A1 | 8/2012 | Ma et al. |
| 2018/0220387 A1* | 8/2018 | Ji ........................ H04L 27/2662 |

FOREIGN PATENT DOCUMENTS

WO    2018153836 A1    8/2018

OTHER PUBLICATIONS

Letter from German law firm Michalski, Hüttermann & Partner dated Sep. 1, 2022.

(Continued)

*Primary Examiner* — Hong Shao
(74) *Attorney, Agent, or Firm* — Pearne & Gordon LLP

(57) ABSTRACT

A method and device for modulating with Zadoff-Chu sequences. Each K-ary symbol to be transmitted is converted into a Zadoff-Chu sequence of preset length N and of preset root r, and the frequency offset q of which is dependent on the K-ary symbol. Various root values may be used to separate distinct uplink and downlink and synchronous or asynchronous communications. The modulating device is implemented in the frequency domain. A demodulating method and device allows the K-ary symbols thus transmitted to be recovered. The demodulating device may be implemented in the time domain or frequency domain.

15 Claims, 9 Drawing Sheets

(56) References Cited

OTHER PUBLICATIONS

Murano, Santiago et al., Comparison of Zadoff-Chu Encoded Modulation Schemes in an Ultrasonic Local Positioning System, 2018 International Conference on Indoor Positioning and Indoor Navigation (IPIN), Sep. 24-27, 2018, pp. 206-212, Nantes, France.
Kebo, Andrew et al., Ambiguity and sidelobe behavior of CAZAC coded waveforms, Proc. of 2007 IEEE National Radar Conference, pp. 99-103.
Search Report issued in French Patent Application No. 1902035 dated Jan. 13, 2020.
International Search Report for Application No. PCT/FR2020/050345 dated Jul. 17, 2020.
Written Opinion for PCT/FR2020/050345 dated Jul. 17, 2020.
Croce, D., et al. "Impact of LoRa Imperfect Orthogonality: Analysis of Link-Level Performance", IEEE Communications Letters, Apr. 4, 2018, pp. 796-799 vol. 22, No. 4.
Chu, David C., "Polyphase Codes With Good Correlation Properties", IEEE Transactions on Information Theory, Jul. 1972, pp. 531-532, vol. IT-18.
Sarwate, Dilip V. "Bounds on Crosscorrelation and Autocorrelation of Sequences", IEEE Transactions on Information Theory, Nov. 1979, pp. 720-724, vol. IT-25, No. 6.
Krenz, Rafal, et al. "Hybrid DS/FH Spread Spectrum Data Transmission System for Telemetry", 2016 10th International Symposium on COmmunication Systems, Networks and Digital Signal Processing (CSNDSP), IEEE, Jul. 20, 2016, pp. 1-5, XP032968135.
3GPP TS 36.211 V13.2.0, § 5.7.2 "Preamble sequence generation", Jun. 2016, pp. 62-65.

\* cited by examiner

METHOD AND DEVICE FOR MODULATING WITH ZADOFF-CHU SEQUENCES

This is the National Stage of PCT international application PCT/FR2020/050345, filed on Feb. 24, 2020 entitled "METHOD AND DEVICE FOR MODULATING WITH ZADOFF-CHU SEQUENCES", which claims the priority of French Patent Application No. 1902035 filed Feb. 27, 2019, both of which are incorporated herein by reference in their entirety.

TECHNICAL FIELD

The present invention generally relates to the field of digital telecommunications, and more particularly those using spread spectrum techniques. It is especially applicable to wireless communication systems and to the Internet of Things (IoT).

STATE OF PRIOR ART

The emergence of pervasive and low data rate radio technologies, adapted to autonomous, low power consumption objects, has recently enabled the development of the Internet of Things (IoT). The wireless communication systems of an IoT network has to obey several constraints.

Firstly, the receiver of a connected object has to have a high sensitivity due to the small number of base stations deployed and therefore the large size of their coverage zones.

Secondly, the transmitter/receiver of a connected object has to be particularly simple and energy-efficient to allow autonomy durations of several years.

Finally, the radio access system has to be scalable insofar as a base station (also known as an IoT gateway) has to be able to serve a large number of connected objects.

The Internet of Things currently covers a wide variety of networks.

Some of them (LTE-M, NB-IoT) use technologies from existing cellular infrastructures. However, these often turn out to be too complex or too energy-consuming for common applications.

Others rely on specific or even proprietary technologies, such as LoRa using Chirped Spread Spectrum (CSS) modulation and SigFox using Ultra Narrow Band (UNB) modulation. These technologies are energy-efficient and can achieve very low reception thresholds, and therefore very wide coverage.

However, these specific technologies have limitations in terms of capacity, that is the number of users that can be served simultaneously in the same coverage zone, due to the degradation of the signal-to-noise ratio plus interference affecting communications. In particular, the high number of unresolved collisions between CSS signals in a LoRa system, even when different spectral spreading factors (SFs) are used, is a barrier to the deployment of large LPWANs based on this technology or even to the deployment of networks by different operators. A discussion of these limitations will be found especially in the paper by D. Croce et al. entitled "Impact of LoRa imperfect orthogonality: analysis of link-level performance" published in IEEE Communication Letters, Vol. 22, No. 4, April 2018, pp. 796-799.

The purpose of the present invention is therefore to provide a modulation method (and an associated modulator) that is particularly adapted to the constraints of IoT networks and provides greater robustness to inter-communication interference. Another purpose of the present invention is to provide a corresponding demodulation method (and an associated demodulator). Finally, a data transmission method is also provided, which takes advantage of the modulation method in question to reduce interference between communications of different users.

DISCLOSURE OF THE INVENTION

The present invention is defined by a method for modulating a plurality of K-ary symbols to be transmitted over a transmission channel, wherein each K-ary symbol is transformed into a Zadoff-Chu sequence, associated with that symbol, said Zadoff-Chu sequence being of length N, root r and frequency offset q where N is a positive integer such that $\log_2 N \geq K$, r is an integer such that $r>1$ and prime to N, q is a relative integer, and any two K-ary symbols of said plurality being associated with Zadoff-Chu sequences having distinct frequency offsets, each K-ary symbol being modulated in the form of a sequence, of length greater than or equal to $2^K$, of consecutive complex elements of the Zadoff-Chu sequence associated with said K-ary symbol.

According to a first embodiment, the sequence of consecutive complex elements consists of all the elements of said Zadoff-Chu sequence. The length of the Zadoff-Chu sequence can advantageously be chosen equal to a power of 2.

According to a second embodiment, the length of said Zadoff-Chu sequence will be chosen equal to the smallest prime number greater than $2^K$ and the sequence of consecutive complex elements being then obtained by truncating said Zadoff-Chu sequence with $2^K$ elements.

Preferably, the length of the Zadoff-Chu sequence is chosen greater than the difference between a maximum frequency offset to modulate the K-ary symbols and the time spread of the transmission channel, expressed in number of transmission periods of elements of this sequence.

The real and imaginary parts of the elements of the sequence of consecutive complex elements of a Zadoff-Chu sequence associated with a K-ary symbol respectively modulate two quadrature carriers and the modulated signal thus obtained is transmitted over the transmission channel.

Alternatively, a phase signal is generated in baseband, obtained as the phase of the consecutive complex elements of the Zadoff-Chu sequence associated with a K-ary symbol, and the phase signal is translated into RF band, the RF signal thus obtained being transmitted over the transmission channel.

The invention also relates to a method for transmitting data over a plurality of communications to or from different users, wherein the data to be transmitted are transformed into K-ary symbols, the K-ary symbols of the different users being modulated by means of the modulation method, the roots of the Zadoff-Chu sequences used to modulate the K-ary symbols of two distinct users being chosen distinct and their lengths chosen equal to a common length.

The roots used to modulate the K-ary symbols of two distinct users are advantageously chosen such that the absolute value of their difference is prime to said common length.

The invention further relates to a modulation device to modulate K-ary symbols to be transmitted over a transmission channel, said device comprising a binary to decimal converter transforming the K bits of each K-ary symbol into a distinct integer value, and a Zadoff-Chu sequence generator, having as input parameters a sequence length N and a root r such that integer r, $r>1$ and prime to N, as well as a frequency offset, q, said generator generating, for each K-ary symbol, a sequence of length greater than or equal to $2^K$, formed by complex elements of a Zadoff-Chu sequence of length N, root r and frequency offset equal to the integer value provided by said binary to decimal converter.

The invention further relates to a method for demodulating a signal representing a Zadoff-Chu sequence modulated in frequency offset using a modulation method as defined above. Said signal is baseband sampled to provide a sequence of complex samples, said sequence of complex samples is correlated by cyclic correlation with a reference Zadoff-Chu sequence to provide a cyclic correlation result and the time position of a correlation peak in the modulus of the cyclic correlation result thus obtained is detected, and finally a frequency offset q̂, corresponding to this time position, is deduced therefrom, said frequency offset being then converted by a decimal to binary converter into a K-ary symbol.

The invention also relates to a device for demodulating a signal representing a Zadoff-Chu sequence modulated in frequency offset by means of a modulation method as defined above.

According to a first alternative, said signal is baseband sampled to provide a first block of complex elements of size N and said demodulation device comprises a DFT module configured to perform a discrete Fourier transform of size N of the first block of complex elements to provide a first block of complex frequency elements, a multiplier for multiplying term by term the complex frequency elements of the first block with the complex frequency elements of a second block obtained by complex conjugation of a discrete Fourier transform of a reference Zadoff-Chu sequence, a modulus calculator for calculating the modulus of the multiplication results of the first and second complex frequency elements, the modulus values thus obtained being compared in a correlation peak detector to determine the frequency position of a cyclic correlation peak, the frequency offset, q̂, corresponding to this frequency position being deduced therefrom and provided to a decimal to binary converter to generate a K-ary symbol.

According to a second alternative, said signal is baseband sampled to provide a first block of complex elements of size N and the demodulation device comprises a cyclic correlator of size N for cyclically correlating said first block with a second block, said second block consisting of a reference Zadoff-Chu sequence, a modulus calculator calculating the modulus of said cyclic correlation and a correlation peak detector determining, from this modulus, the time position of a cyclic correlation peak and deducing a frequency offset, q̂ corresponding to this time position therefrom, said frequency offset being then provided to a decimal to binary converter to generate a K-ary symbol.

The invention finally relates to a transmitter/receiver system comprising a modulation device and at least one demodulation device, as defined above.

When the system comprises a plurality of modulation devices, each modulation device of said plurality advantageously corresponding to a different root value, and/or a plurality of demodulation devices according to the first or second alternative, each demodulation device of said plurality corresponding to a different root value.

BRIEF DESCRIPTION OF THE FIGURES

Further characteristics and advantages of the invention will become apparent upon reading a preferential embodiment of the invention, described with reference to the accompanying figures, among which.

DESCRIPTION OF THE EMBODIMENTS

Figure 1:
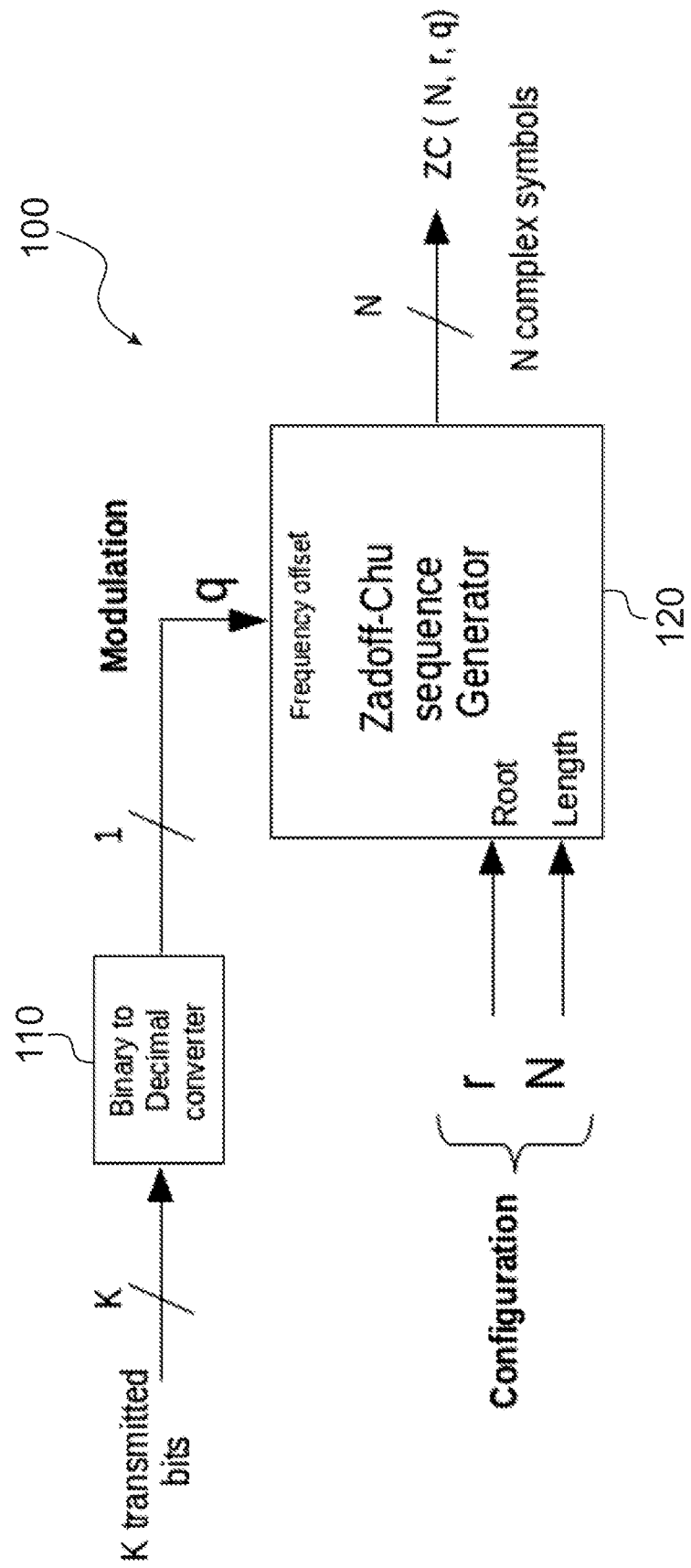
FIG. 1 schematically represents a modulation device according to one embodiment of the invention.

The idea underlying the present invention is to perform an K-ary-to-signal modulation by modulating the offset frequency of a Zadoff-Chu sequence, the separation between different synchronous or asynchronous, uplink or downlink communications, being obtained by choosing different roots.

It is first reminded that a Zadoff-Chu sequence of root r, length N and frequency offset is defined by the sequence of complex elements:

$$ZC_N^{r,q}(k) = e^{-j\frac{\pi}{N}r(k+1+2q)k}, k = 0, \ldots, N-1 \text{ if } N \text{ is odd} \quad (1)$$

$$ZC_N^{r,q}(k) = e^{-j\frac{\pi}{N}r(k+2q)k}, k = 0, \ldots, N-1 \text{ if } N \text{ is even} \quad (2)$$

where N is a positive integer, q is a relative integer, $0 < r < N$ and r,N are prime to each other. An introduction to Zadoff-Chu sequences could be found in the paper by D. C. Chu entitled "Polyphase codes with good correlation properties", IEEE Trans. Inform. Theory, vol. IT-18, pp. 531-532, July 1972.

If phases of successive elements of a Zadoff-Chu sequence are considered, it can be seen that they include a linear component as well as a quadratic component depending on the time index k. The linear component corresponds to a frequency offset $$-q\frac{r}{N}f_s,$$

where $f_s$ is the frequency at which the elements of the sequence are generated and the quadratic component corresponds to a linear variation of the instantaneous frequency with a deviation of $-rf_s$ over the length of the sequence.

Zadoff-Chu (ZC) sequences have some very interesting characteristics for communication systems. First, they have a constant amplitude (all elements of a ZC sequence belong to the unit circle), giving rise to modulated signals with low PAPR. Secondly, the periodic autocorrelation of a ZC sequence is perfect in that it is zero for any non-zero offset (in other words, the periodic autocorrelation function of a ZC sequence is a Dirac comb having a period N). Finally, the periodic crosscorrelation of two ZC sequences of the same odd length N and distinct roots r,u with |r−u| prime to N, is a periodic function whose modulus is bounded by $\sqrt{N}$. It has furthermore been shown in the paper by D. V. Sarwate entitled "Bounds on crosscorrelation and autocorrelation of sequences", published in IEEE Trans. on Information Theory, Vol. IT-25, No. 6, November 79, pp. 720-724 that this bound on the periodic crosscorrelation function is optimal for a sequence with a perfect periodic autocorrelation function. In other words, there are no better sequences than Zadoff-Chu sequences in terms of autocorrelation and crosscorrelation properties.

In an original way, it is proposed to modulate the frequency offset of a Zadoff-Chu sequence to transmit a word of $K \leq \log_2 N$ bits. It should be noted that the frequency offset of a ZC sequence is generally taken to be zero in prior art, especially when it is used for synchronisation purposes, as is the case in the generation of preambles in the LTE system (see 3GPP TS 36.211, § 5.7.2 entitled "preamble sequence generation").

FIG. 1 schematically represents a modulation device according to a first embodiment of the invention.

The modulation device, 100, comprises a Binary to Decimal Converter (BDC), 110, which converts a word of K bits to be transmitted, $\alpha_0, \ldots, \alpha_{K-1}$ (where $\alpha_0$ is the LSB and $\alpha_{K-1}$ is the MSB) into an integer value $$q = \sum_{k=0}^{K-1} \alpha_k 2^k.$$

This integer value is provided as a frequency offset value to a Zadoff-Chu sequence generator, 120.

The word to be transmitted can result from a channel coding of information symbols, possibly after they have been interleaved. Alternatively, the word to be transmitted can be a pilot symbol for a transmission channel.

The word to be transmitted can also result from a Gray coding of information symbols. It is reminded that, according to this coding, two successive binary words produce code words differing by only one bit.

The generator 120 further receives as input parameters the root r and length N of the sequence to be generated. The parameters r and N can be provided by a transmission resource scheduler as set out later.

The complex elements of the Zadoff-Chu sequence $ZC_N^{r,q}$ generated by the generator 120, are then used to modulate an (RF or IF) carrier in a manner known per se.

It is important to note that in all cases, the complex element sequence at the output of the modulator is a Zadoff-Chu sequence as defined above. In particular, there is no need to perform any phase correction at the output of the generator 120 and the structure of the modulator is therefore particularly simple.

As has been seen above, the integers r and N are chosen to be prime to each other.

According to a first alternative, in order to respect this constraint, the number N is chosen to be prime. In the latter case, the interference between two communications of the same length N, but distinct roots r,u will be bounded by the same value, proportional to $\sqrt{N}$.

Preferably, however, for reasons of ease of implementation, the sequence $ZC_N^{r,q}$ generated by the generator can be truncated to a length $2^{K'} < N$ with $K' \geq K$, in particular it can be truncated to the length $2^K$ to obtain an optimal rate.

According to a second advantageous alternative, for reasons of simplicity of implementation previously indicated, the number N will be chosen equal to a power of 2, for example $N=2^K$, the root r being then odd, so that r and N are prime to each other.

Furthermore, the roots of the ZC sequences will be chosen greater than 1(r>1). It is noticed that, in this case, the phase variation for an unmodulated ZC sequence (that is with q=0) presents at least one aliasing between successive elements of the sequence, in other words the instantaneous frequency has at least one discontinuity over the length of the sequence. Indeed, the phase rotation between two successive elements can be written as:

$$\varphi(k+1) - \varphi(k) = -\frac{2\pi}{N}r(k+1) \text{ if } N \text{ is odd} \quad (3\text{-}1)$$

$$\varphi(k+1) - \varphi(k) = -\frac{2\pi}{N}r\left(k + \frac{1}{2}\right) \text{ if } N \text{ is even} \quad (3\text{-}2)$$

Thus, if r>1, the phase rotation at the end of the sequence can exceed $2\pi$.

Equivalently, the instantaneous frequency can be expressed as:

$$f(k) = \frac{1}{2\pi}\frac{d\varphi}{dk} = -\frac{r}{N} \cdot k \quad (4)$$

and, if r>1, the instantaneous frequency can exceed the rate $f_s$ at which the elements of the sequence are generated.

Figure 2A:
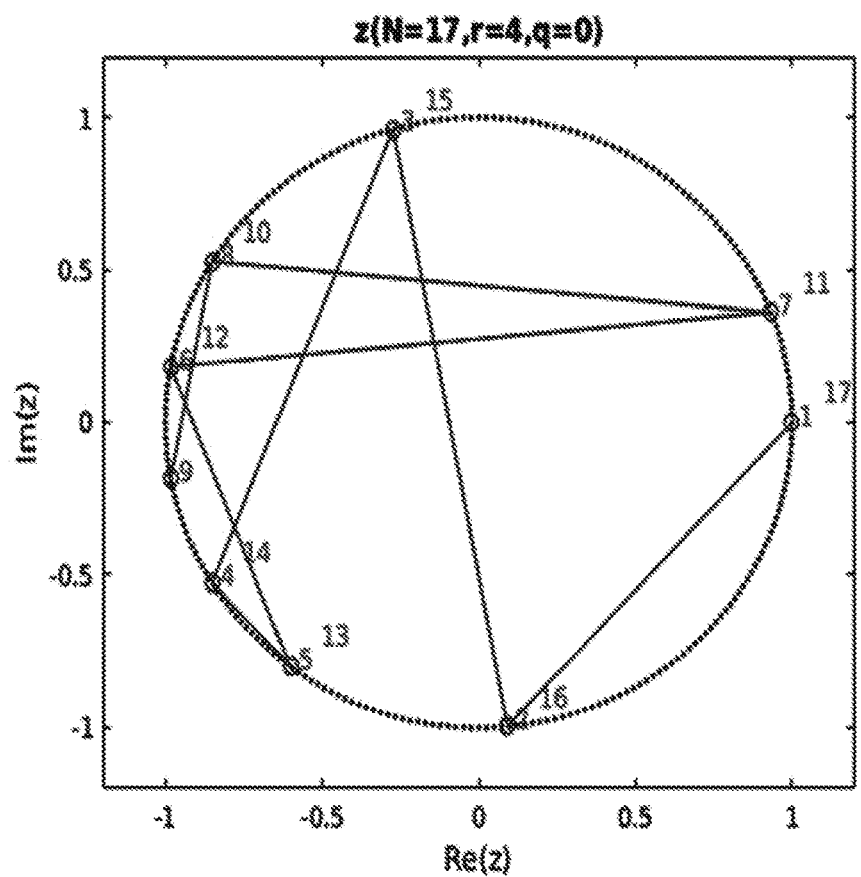
FIG. 2A and FIG. 2B represent an example of a basic Zadoff-Chu sequence and an example of a modulated Zadoff-Chu sequence respectively.
Figure 2B:
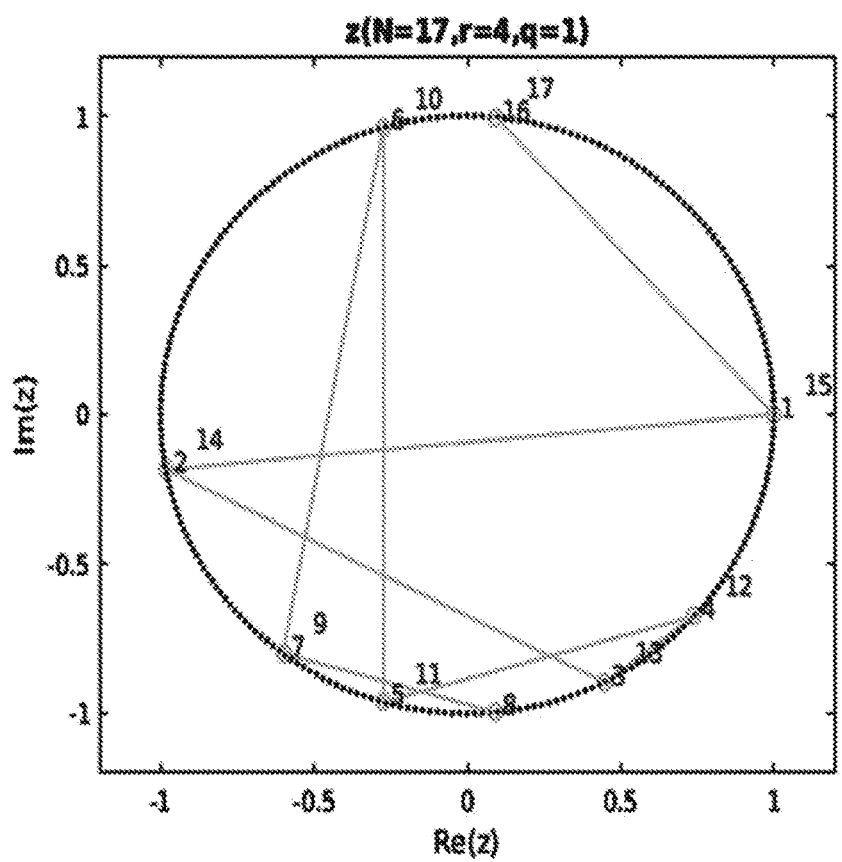

As an example, the successive elements of an unmodulated Zadoff-Chu sequence have been represented in FIG. 2A and those of the same sequence, modulated by a frequency offset, have been represented in FIG. 2B.

In the case illustrated, the length of the sequence is N=17 and its root is r=4. It is noticed that the first phase aliasing occurs between the 5th and 6th elements, with phase rotations between subsequent successive elements leading a fortiori to aliasing, given the relationship (3-1).

Similarly, in FIG. 2B, the same sequence, this time modulated with an offset q=1 has been considered. It is noted that the first phase aliasing occurs here as soon as the transition between the 4th and the 5th element.

Thus, for a same basic ZC sequence, it is understood that distinct distributions of the elements of the modulated sequence are obtained with different frequency offsets.

Figure 3A:
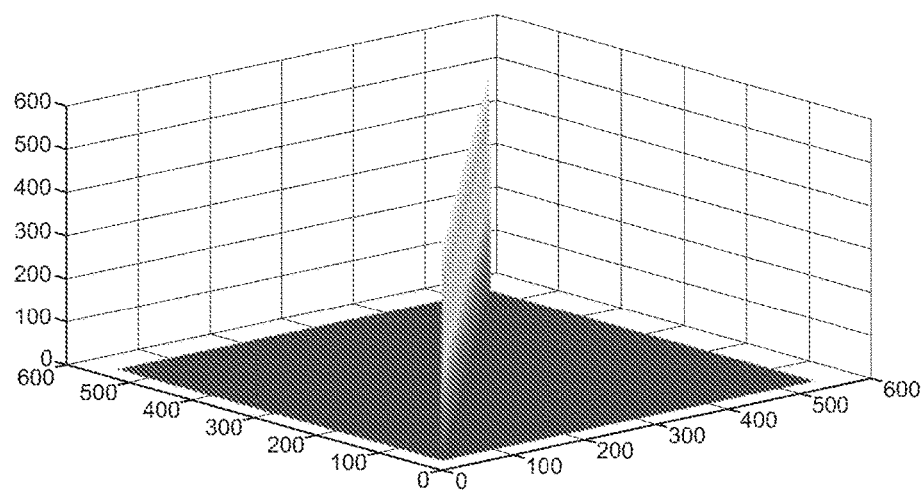
FIG. 3A, FIG. 3B and FIG. 3C represent a cyclic correlation peak matrix for three examples of Zadoff-Chu sequence families respectively.

FIG. 3A schematically represents the matrix of cyclic correlation maxima of unmodulated Zadoff-Chu sequences (q=0) of length N=521 (prime number) and respective roots $r=2, \ldots, 520$. In other words, for two sequences of $ZC_N^{r,0}$ and $ZC_N^{r',0}$, the figure represents on the ordinate the maximum on $\tau$ of $$\left|\left[ZC_N^{r,0} \underset{cycl}{*} ZC_N^{r',0}\right](\tau)\right|$$

where $\tau$ is a shift between the two sequences $ZC_N^{r,0}$ and $ZC_N^{r',0}$, and $*_{cycl}$ represents the cyclic correlation of length N. It is actually checked that the maximum (N) is obtained on the diagonal (maxima of the autocorrelation functions) and that the cyclic crosscorrelation functions have a low modulus (bounded by $\sqrt{N}$).

Figure 3B:
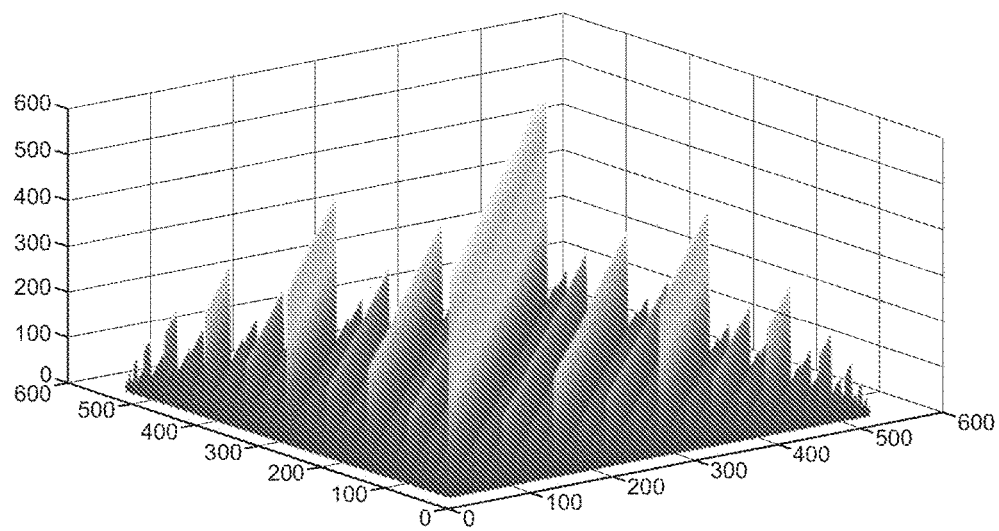

FIG. 3B schematically represents the matrix of cyclic correlation maxima of unmodulated ZC sequences (q=0) of length N=512 and respective roots r=2, ..., 511. It will be noted that some of these sequences are not strictly speaking ZC sequences insofar as r and N are not prime to each other.

It is noticed that the diagonal of the matrix always consists of maximum values (N) but that the maxima of cyclic crosscorrelation strongly depend on the pair of sequences $ZC_N^{r,0}$, $ZC_N^{r',0}$. By suitably choosing the values of the roots (especially those which are prime to N), a subfamily whose cyclic crosscorrelation functions are bounded by a predetermined maximum value is obtained.

Figure 3C:
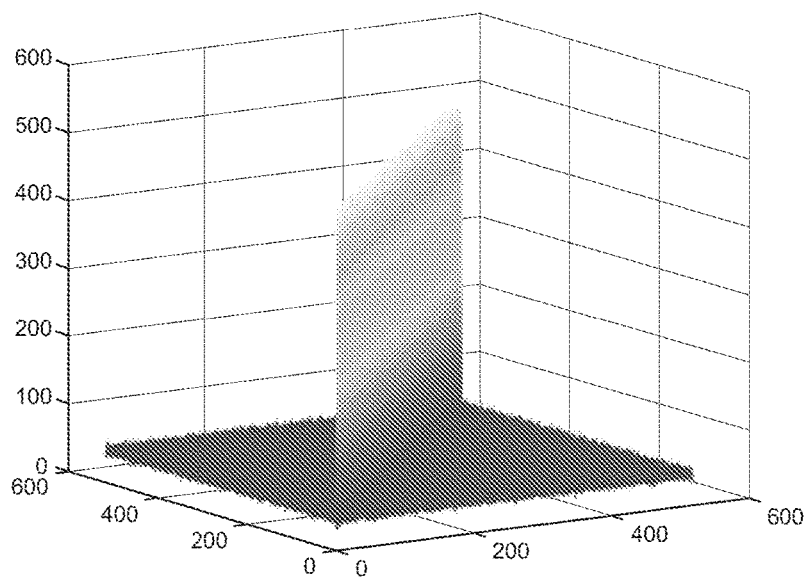

FIG. 3C schematically represents the matrix of cyclic correlation maxima of unmodulated ZC sequences (q=0) of length equal to the prime N=521 but truncated to 512 elements. It can be seen that the autocorrelation and cyclic crosscorrelation performance is only slightly degraded with respect to that illustrated in FIG. 3A.

In general, if it is desired to opt for a sequence of length equal to a power of 2, $P=2^K$ the ZC sequence whose length N is equal to the smallest prime number greater than P could be selected and truncated to P elements. Thus, performance losses will be minimal both in terms of rate and level of crosscorrelation.

Thus, for example, for a sequence of length 128, 256, 512, 1024, 2048, 4096, a ZC sequence with a length of 131, 257, 521, 1031, 2053, 4099 will be chosen respectively.

The length N of the sequences to be generated can be selected as a function of various criteria such as SNR (Signal to Noise Ratio), BER (Bit Error Rate), the required communication rate, or even the time spread of the transmission channel as set out later.

More precisely, the Spreading Factor (SF) is none other than N/K, the choice of a high value of N allows BER to be reduced for a same SNR value or to be in accordance with a BER rate for degraded SNR conditions. Likewise, a low value of N allows the transmission bandwidth to be reduced and the communication rate to be increased.

Then, for a given value of N, distinct roots are chosen for communications the interference of which is desired to be reduced. For example, two distinct roots can be assigned to two communications on a downlink channel, originating from the same base station and to two connected objects or two terminals located within the coverage of this base station, regardless of whether these two communications are synchronous or not. Furthermore, two distinct roots can be assigned for two distinct communications on the downlink channel to one and the same receiver.

Similarly, for the uplink channel, two connected objects or two terminals that can interfere can be assigned distinct roots.

The allocation of sequence lengths/roots can be done dynamically by a scheduler. In some cases, dynamic scheduling can be implicit. For example, if two uplink communications interfere, the base station can notify the connected objects concerned of this situation and at least one of them can switch to another following root in a predetermined root sequence, known to both the connected object and the base station. The person skilled in the art can provide for different alternatives of scheduling between neighbouring base stations, according to a centralised or distributed mode, without departing from the scope of the present invention.

Figure 4:
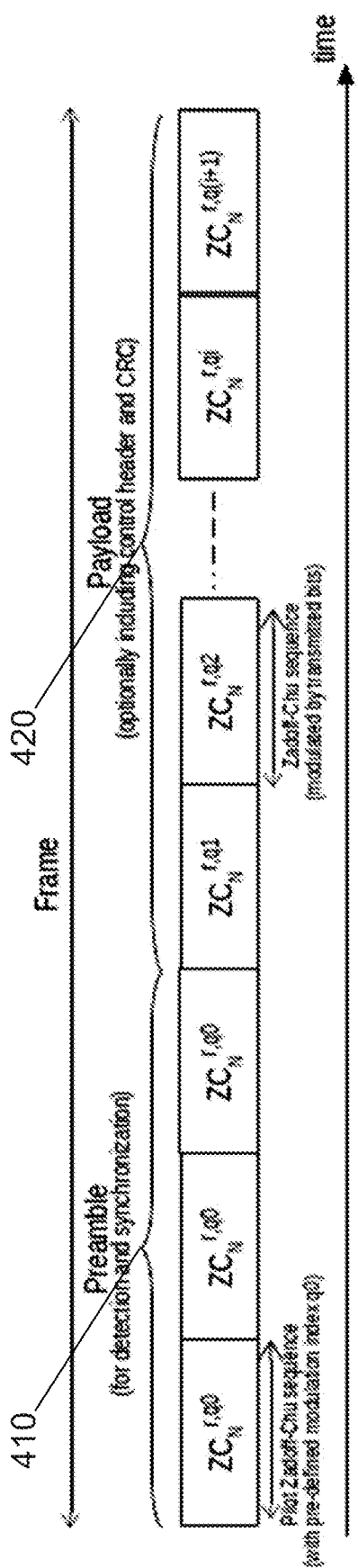
FIG. 4 schematically represents a transmission frame using the modulation method according to one embodiment of the invention.

Whatever the embodiment, the transmission of packets of K-ary symbols, namely words of K bits, is typically carried out by means of transmission frames whose structure is illustrated in FIG. 4.

This transmission frame comprises a preamble, 410, and a payload, 420. The preamble contains pilot symbols to enable the receiver to detect the start of the frame and be synchronised.

For example, the pilot symbols will be associated with a dedicated frequency offset, $q_0$, for example $q_0=0$. In other words, in this case, the preamble of a transmission frame will only consist of unmodulated ZC sequences.

The pilot symbols will be detected by the receiver by means of a correlator that performs a running correlation (or continuous correlation) on the received signal. For example, the repetition of a predetermined number, M, of pilot symbols can be an indicator of the start of a frame. In order to facilitate synchronisation and detection of the start of a frame (or even a sequence of frames), these pilot symbols can be multiplied by elements of a coverage code with good aperiodic correlation properties, for example the elements of a Barker code. Receiver synchronisation by preamble detection will be described later in connection with FIG. 8. Receiver resynchronisation can be performed regularly during the reception time of a sequence of frames, at every frame or generally every J frames where is J a predetermined integer.

Figure 5:
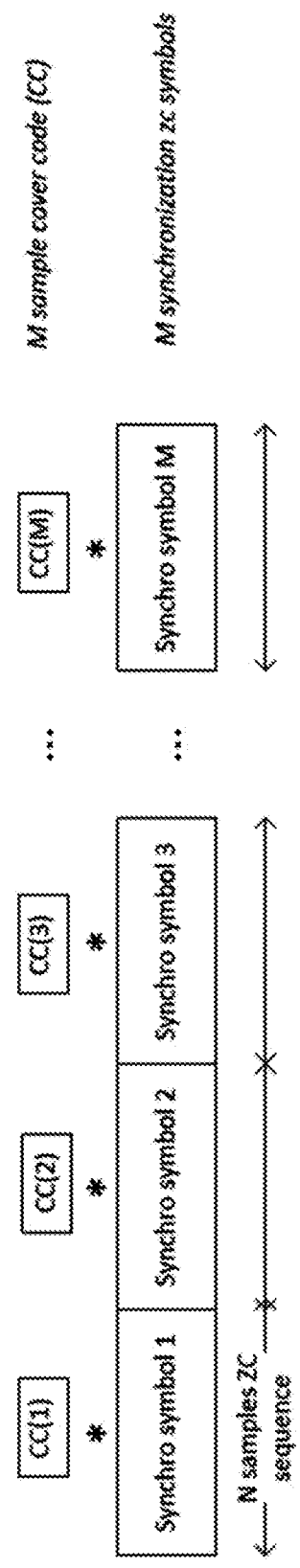
FIG. 5 schematically represents a sequence of pilot symbols multiplied by elements of a coverage code.

FIG. 5 shows a series of pilot symbols of a frame preamble, respectively multiplied by the M elements of a coverage code, denoted CC(1), ..., CC(M). In other words, the first ZC sequence, corresponding to the first pilot symbol, is multiplied by CC(1), the second ZC sequence, corresponding to the second pilot symbol, is multiplied by CC(2), and soon until the last ZC sequence, multiplied by CC(M).

For example, the elements of a Barker code of length M=11 are given by: +1, +1, +1, −1, −1, +1, −1, −1, +1, −1

Upon reception, the individual pilot symbols (that is the ZC sequences corresponding to these pilot symbols), are multiplied by the same coverage code elements before or after continuous correlation. When the coverage code elements are perfectly aligned with the pilot symbols, the correlation result has a maximum.

The payload of the transmission frame consists of ZC sequences modulated by the K-ary words to be transmitted. It can also include a control header and ZC sequences modulated by CRC symbols.

Although K-ary symbols are successively transmitted and therefore the ZC sequences modulated by these symbols also succeed each other at the transmitter, the transmission channel can, if it is a multipath channel, give rise to inter-symbol interference.

In other words, a replica of a ZC sequence modulated by a first symbol can be superimposed at the receiver with a ZC sequence modulated by a second symbol.

In order to reduce inter-symbol interference, a sequence of length N will be advantageously chosen such that:

$$N-\Delta > q_{max} \qquad (5)$$

where $\Delta$ is the time spread of the transmission channel and $q_{max}$ is the maximum frequency offset for modulating the K-ary symbols, both expressed in number of element generation periods of the ZC sequence. Indeed, as long as the overlap between consecutive symbols, due to the transmission channel spread, is of a duration shorter than the duration $(N-2^K)$ of the redundant part of the ZC sequence, the symbols in question can be recovered without loss of information.

Figure 6:
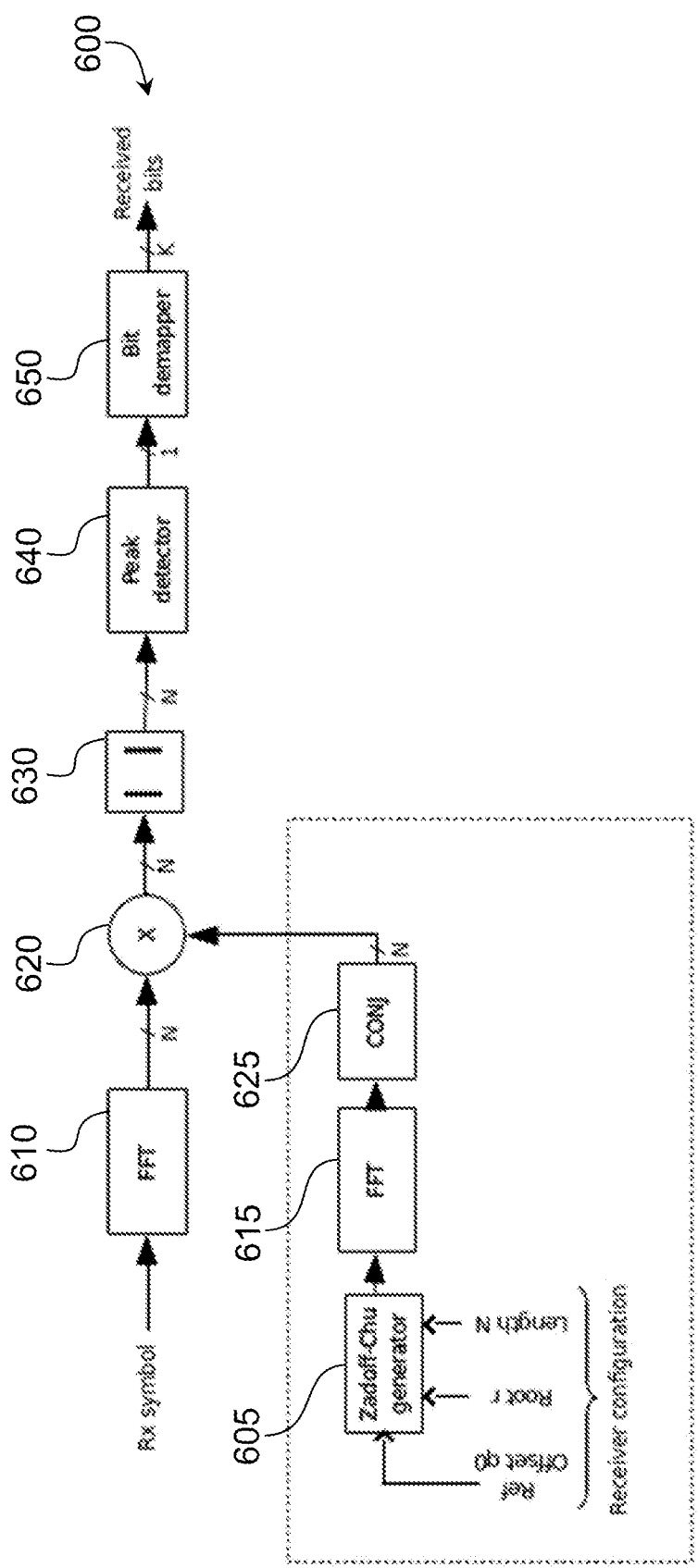
FIG. 6 schematically represents a demodulation device according to a first embodiment of the invention.

FIG. 6 schematically represents a demodulation device according to a first embodiment of the invention.

This first embodiment corresponds to an implementation of the cyclic correlator in the frequency domain.

The demodulator receives the signal corresponding to a frame of symbols as described above, that is a series of ZC sequences obtained by modulating these symbols.

The demodulator, 600, includes an FFT module, 610, for performing an FFT of size N (equal to the length of the ZC sequence) on the received signal, previously sampled (by two quadrature clocks) at the frequency $f_s$ at which the elements of the ZC sequences are generated. The result of the FFT is a block of N complex values.

Detection of the start of the frame and the ZC sequences is achieved by means of the series of pilot symbols in the preamble. It is assumed that the receiver has previously synchronised itself by means of preamble detection as described later.

The demodulator includes a local generator of a reference ZC sequence, 605, identical to the generator present in the modulator of FIG. 3 or 4. The local generator is parameterised by the length N of the ZC sequence, the root r used for communication and, if applicable, the frequency offset $q_0$, dedicated to the pilot symbols. The root r used for communication can be provided by the preamble detector described later.

A discrete Fourier transform (DFT) module, 615, enables a DFT of size N to be performed on the block of elements of the ZC sequence provided by the local generator, 605. When N is a power of 2, the DFT will be performed using an FFT.

The block of N complex values thus obtained in the frequency domain is conjugated in the conjugation module, 625, before being multiplied term by term in 620 with the block of N complex values from the DFT module, 610.

The moduli of these N complex values are calculated in 630 and compared by the correlation peak detector 640. In other words, the peak detector 640 determines the frequency offset corresponding to the largest modulus complex value on the block received.

Since the cyclic correlation peak of two ZC sequences of the same length N, same root r and frequency offsets $q, \ell$ has the value $|\rho[ZC_{r,q}^N, ZC_{r,\ell}^N]| = N\delta(q-\ell)$, this peak discrimination is very effective, even in the presence of truncated ZC sequences. The 640 detector therefore determines:

$$\hat{q} = \arg\max_q \left( \left| \rho[ZC_{r,q}^N, \sigma] \right| \right) \tag{6}$$

where $\sigma$ represents the sequence N of samples received by the demodulator and $\rho$ represents the cyclic correlation operation.

This frequency offset is finally translated into a word of K bits, $\hat{\alpha}_0, \ldots, \hat{\alpha}_{K-1}$ in the decimal to binary converter (denoted by bit demapper in the figure), 650.

It should be noted that generator 605 will be able to generate reference sequences for all possible values of r and, if applicable, N.

The reference sequence can be any ZC sequence of the same length and same root as that transmitted by the transmitter as long as the frequency offset can be determined relatively to that used to generate the reference frequency. Thus, for example, the reference sequence can be an unmodulated ZC sequence or a ZC sequence corresponding to a pilot symbol (and therefore an offset $q_0$).

In all cases, the set consisting of the reference sequence generator, 605, the DFT module, 615, and the conjugation module, 625, can be replaced by a simple memory addressed by the length N, root r and, if applicable, reference frequency offset. The value stored in the memory at this address will be simply $(\widetilde{ZC}_{r,q_0}^N(v))^*$, where $\widetilde{ZC}_{r,q_0}^N(v)$ is the value taken by the discrete Fourier transform of $ZC_{r,q_0}^N$, at the frequency v and z* is the conjugate of z. The values ($\widetilde{ZC}_{r,q_0}^N(v))^*$ read from memory are then provided in turn to the multiplier, 620.

Figure 7:
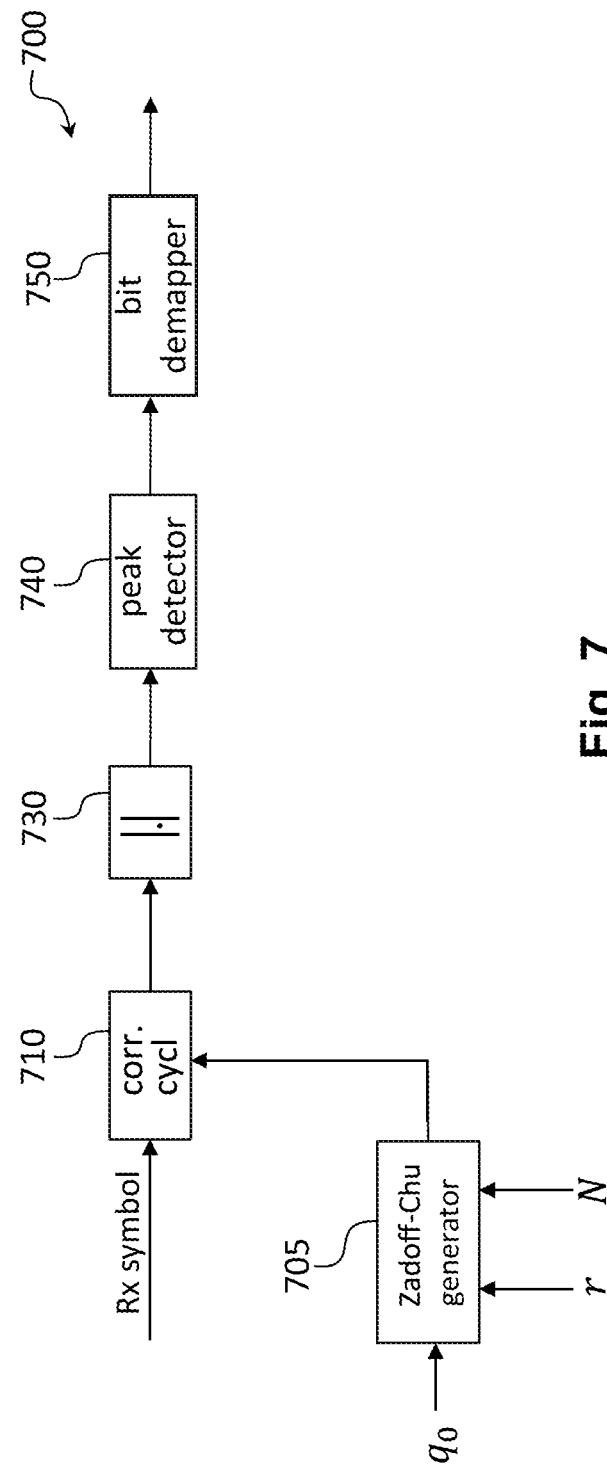
FIG. 7 schematically represents a demodulation device according to a second embodiment of the invention.

FIG. 7 schematically represents a demodulation device according to a second embodiment of the invention.

This second embodiment corresponds to an implementation of the cyclic correlator in the time domain.

The signal received by the demodulator 700 is sampled (by two quadrature clocks) at the frequency $f_s$ at which the elements of the ZC sequences are generated. The result is a block of N complex values. This block is provided to a cyclic correlator, 710.

The cyclic correlator 710 additionally receives the N successive elements of a reference ZC sequence generated by the local generator 705. This local generator is identical to the generator present in the modulator of FIG. 1. The local generator is parameterised by the length N of the ZC sequence, the root r used for communication and, if applicable, the frequency offset $q_0$, dedicated to the pilot symbols.

The elements of the ZC reference sequence are provided to the cyclic correlator 710. The cyclic correlation results (corresponding to different delay times in the time domain) are modulus calculated in 730 and the maximum modulus value on the block is determined by the correlation peak detector 740. The peak detector 740 determines the position of the cyclic correlation peak between the ZC reference sequence and the ZC sequence received by the demodulator and deduces the corresponding time offset therefrom.

Given the definition of the ZC sequences, it can be shown that a cyclic permutation of a ZC sequence by means of a time offset results in a frequency offset:

If N is an odd value:

$$ZC_N^{r,0}(k+q') = \tag{7-1}$$

$$e^{-j\frac{\pi}{N}r(k+1+q'+1)(k+q')} = e^{-j\frac{\pi}{N}r[(k+2q'+1)k+(q'+1)q']} = e^{j\varphi_0} e^{-j\frac{\pi}{N}rk(k+2q'+1)}$$

where $$e^{j\varphi_0} = e^{-j\frac{\pi}{N}r(q'+1)q'}$$

is a constant phase term along the sequence.

Similarly, if N is an even value:

$$ZC_N^{r,0}(k+q') = \tag{7-2}$$

-continued $$e^{-j\frac{\pi}{N}r(k+q')(k+q')} = e^{-j\frac{\pi}{N}r[k^2+2q'k+q'^2]} = e^{j\phi_0}e^{-j\frac{\pi}{N}r(k+2q')k}$$

where $$e^{j\phi_0} = e^{-j\frac{\pi}{N}rq'^2}$$

is a constant phase term along the sequence.

Since the detection is performed on the modulus of the cyclic correlation result, it will be understood that a time offset, q', (expressed in number of periods $T_s=1/f_s$) results in an offset in frequency q' (expressed in increments $$\frac{r}{N}f_s\bigg).$$

In other words, for a same received signal, the time offset value provided by the peak detector 740 (expressed in number of periods $T_s=1/f_s$) will be identical to the frequency offset value provided by the peak detector 640.

The decimal to binary converter 750 (referred to as the bit demapper in the figure) converts this offset value into a binary number, $\hat{\alpha}_0, \ldots, \hat{\alpha}_{K-1}$.

It should be noted that generator 705 will be able to generate reference sequences for all possible values of r and, if applicable, N.

In any case, as previously, the set consisting of the reference sequence generator 705 can be replaced by a simple memory addressed by the length N, root r, reference time (or frequency) offset. The value stored in the memory at this address will simply be $ZC_{r,q}^N(k)$. The values $ZC_{r,q}^N(k)$ read from the memory are provided to the cyclic correlator, 710.

Figure 8:
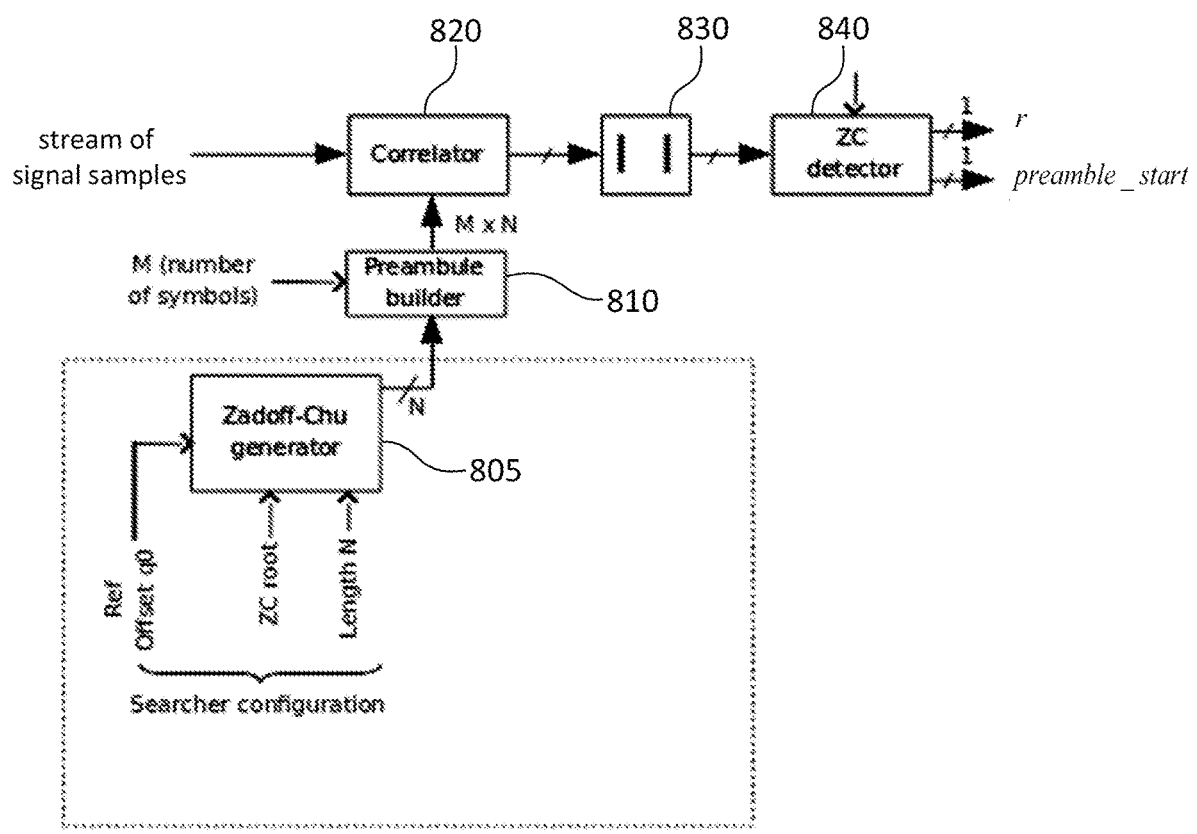
FIG. 8 represents a preamble detection synchronisation device that can be used in conjunction with a demodulation device according to one embodiment of the invention.

FIG. 8 schematically represents a preamble detection synchronisation device that can be used in conjunction with a demodulation device according to the invention.

More precisely, this synchronisation device makes it possible to provide the demodulator with the root r used for communication on the one hand, and on the other hand, the time instant corresponding to the start of the frame, or even of the payload.

A continuous correlator 820 receives, on a first input, the stream of (complex) samples of the received signal and, on a second input, a sequence of samples corresponding to a replica of the preamble.

The replica of the preamble is formed by the module 810 from the ZC sequences generated by the local generator 805. The local generator 805 is identical to the previously described generator 605 (or 705) and the same alternatives also apply. The preamble formation module 810 concatenates the ZC sequences of the pilot symbols of the preamble. For example, if the preamble consists of M repeating identical pilot symbols, the module 810 will repeat M times the ZC sequence of that pilot symbol. Furthermore, if the preamble uses a Barker cover sequence, the module 810 will multiply each ZC sequence with the corresponding code element.

Of course, the generator 805 and the module 810 can be implemented using a simple memory addressed by the frequency offset $q_0$ corresponding to the pilot symbols, root r and length N of the sequence and the number M of repetitions of the pilot symbols.

The correlator 820 performs a running correlation of the sequence of samples of the received signal with the sequence of samples of the preamble provided by the module 810. In other words, at each period $T_s$, the correlator calculates a correlation result of the MN preamble samples with the last MN signal samples.

The modulus of these correlation results is calculated in 830 and a correlation peak detection is performed in the detector 840. In practice, the detector compares the modulus value provided by 830 with a predetermined threshold smaller than N.

The detector gives the time position of the correlation peak, indicating start of the preamble and hence of the frame. The demodulator can then lock onto the start of the payload to demodulate information symbols.

Furthermore, if the root r is not known to the receiver, the synchronisation device can perform a sequential or parallel search on preambles generated from values of roots belonging to the set of possible roots or even a subset of the latter (for example if the set of roots is hierarchical and the receiver has a priori knowledge of the tree branch in which the root is located). By sequential search it is meant that the correlation is performed with a rate $Rf_s$ on the R roots to be tested. By parallel search, it is meant that the correlation is performed on R branches in parallel, each branch being associated with one of the R roots to be tested. In any case, the correlation results are processed by the detector 840. The detector then determines both the root value (providing a correlation peak) and start of the preamble (from the position of this peak).

Figure 9:
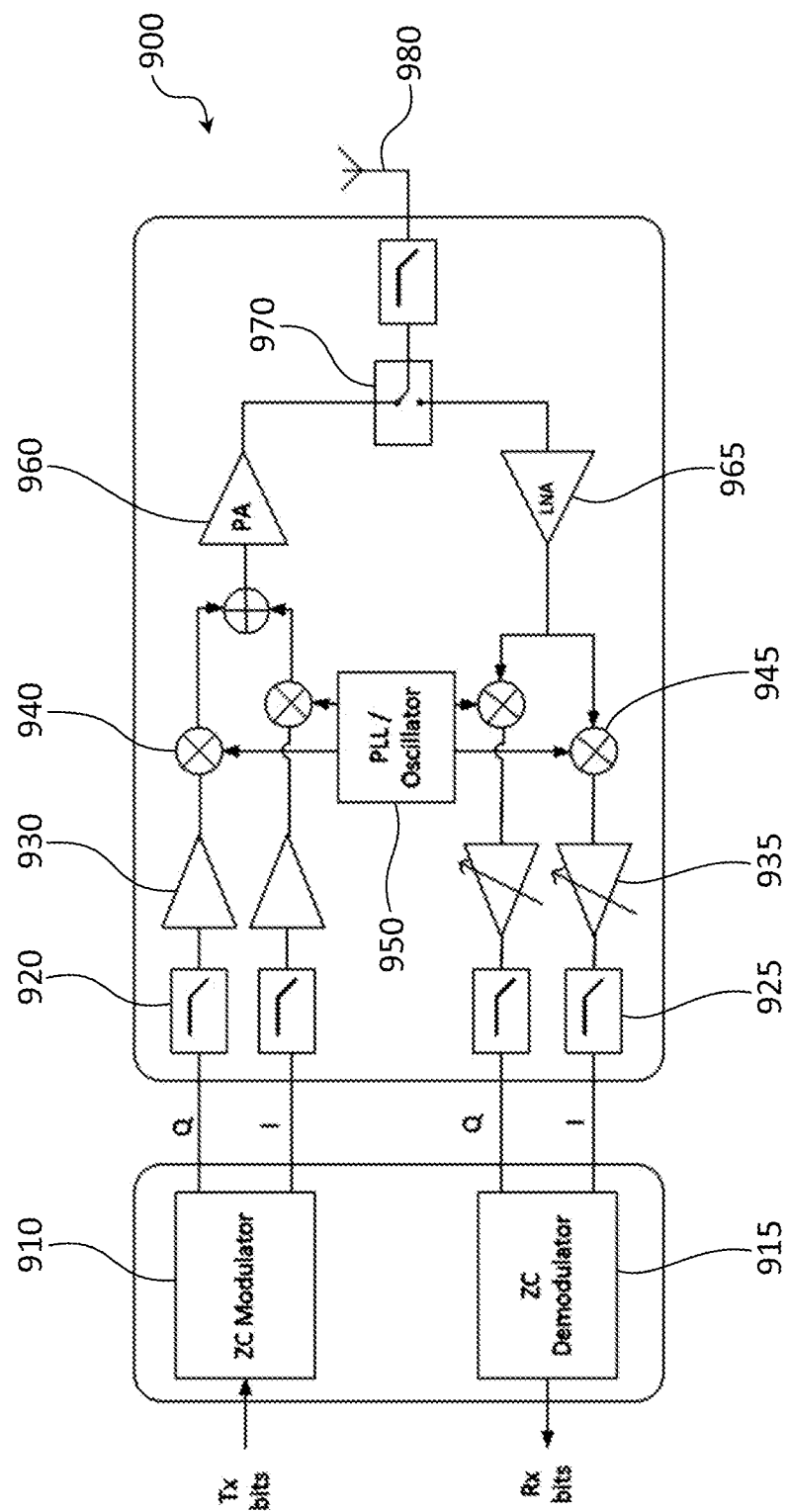
FIG. 9 schematically represents a first transmitter/receiver using a modulation device and a demodulation device according to one embodiment of the invention.

FIG. 9 schematically represents a first transmitter/receiver using a modulation device and a demodulation device according to one embodiment of the invention.

The transmitter/receiver 900 can be fitted to a base station or a connected object, for example.

It comprises a modulation device, 910, according to the embodiment as described in connection with FIG. 1. The modulation device transforms the K-ary symbols to be transmitted into ZC sequences, a K-ary symbol being converted into a frequency offset of a ZC sequence. The complex elements of a ZC sequence are provided by the modulation device at a rate $f_s$. The real part of these complex elements is provided to an in-phase channel and the imaginary part to a quadrature channel, each channel typically comprising a low-pass filter, 920 and a baseband amplifier 930. The I and Q signals of these channels are respectively mixed with two quadrature carrier signals in a quadrature modulator, 940. The carrier signals are generated by a frequency-stabilised sinusoidal oscillator, 950. The RF signal at the output of the quadrature modulator is amplified in a power amplifier, 960, and then transmitted by an antenna, 980, via a duplexer, 970.

Upon reception, the antenna signal received via the duplexer 970 is amplified by a low noise amplifier (LNA), 965, and then quadrature demodulated by the quadrature mixer 945. The I and Q signals at the output of the mixer are amplified by the amplifiers 935, filtered by the low pass filters 925 and then sampled at the rate $f_s$. The complex samples thus obtained are provided to a demodulation device 915, according to the first embodiment, as described in connection with FIG. 6, or according to the second embodiment, as described in connection with FIG. 7.

The quadrature modulator 940 in the direct conversion transmitter/receiver of FIG. 9 uses the real and imaginary parts of the elements of the ZC sequences to be transmitted. Instead of the quadrature modulator, a polar modulator can be used as described hereinafter.

Figure 10:
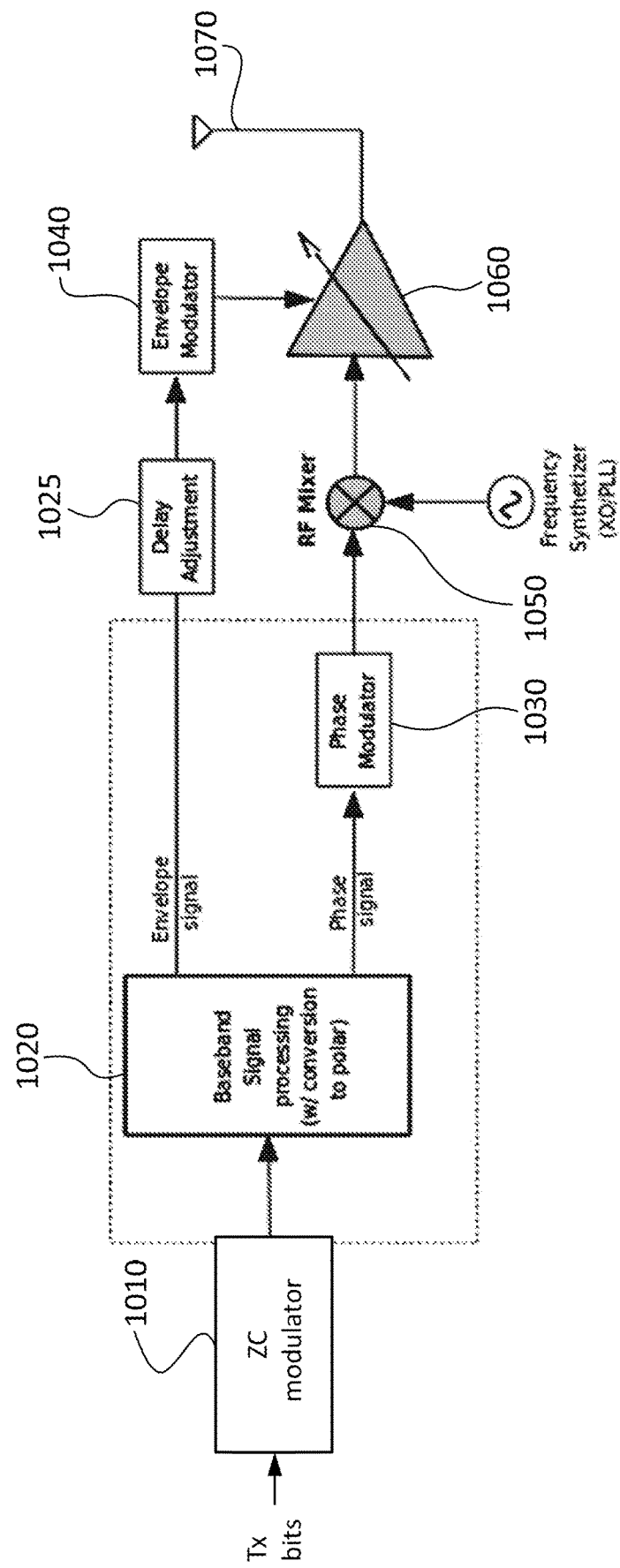
FIG. 10 schematically represents a polar modulator usable in a second transmitter according to one embodiment of the invention.

FIG. 10 schematically represents a polar modulator usable within the scope of a second transmitter according to one embodiment of the invention.

In general, in a polar modulator, the complex symbols to be transmitted are converted in a polar baseband converter, 1020, into an envelope signal (modulus of the complex elements) and a phase signal (instantaneous phase of the complex elements) representing the baseband signal:

$$s(t)=A(t)\cos(2\pi f_0 t+\varphi(t)) \quad (8)$$

Where A(t) is the envelope signal and $\cos(2\pi f_0 t+\varphi(t))$ is the phase signal. The phase signal is then translated into the RF band by virtue of the mixer 1050 before being amplified by the power amplifier 1060. The envelope signal is delayed at 1025 to compensate for differences in propagation time that may exist between the amplitude branch and the phase branch, and modulates the amplitude of the RF signal, by means of the envelope modulator 1040, by controlling the gain of the power amplifier. The RF signal thus modulated is then transmitted by the antenna 1070.

In the case where, as in the present invention, it is a question of transmitting complex elements of a ZC sequence, as generated by the modulator 1010, it is understood that the generation of the envelope signal will be unnecessary insofar as the modulus of these elements is constant and equal to 1. The delay 1025 and the envelope modulator 1040 can simply be removed and the gain of the power amplifier set to a set point value.

The skilled person will understand that, symmetrically, a polar demodulator can be implemented in reception.

RF transmitter/receiver architectures other than those illustrated in FIGS. 9 and 10 can be further contemplated without departing from the scope of the present invention.

Of course, different elementary modulation/demodulation devices can be provided within a same transmitter/receiver to separate communications to/from different users. As previously indicated, these modulation/demodulation devices will then use distinct root values. Advantageously, for a ZC sequence length equal to N, root values $r_p$, p=1, ..., P will be chosen such that $|r_p-r_{p'}|$ is prime to N, $\forall$p, p'.

What is claimed is:

1. A method for modulating a plurality of K-ary symbols to be transmitted over a transmission channel, wherein each K-ary symbol is transformed into a Zadoff-Chu sequence associated with this symbol, said Zadoff-Chu sequence being of length N, root r and frequency offset q where N is a positive integer such that $\log_2 N \geq K$, r is an integer such that r>1 and prime to N, q is a relative integer, and that any two K-ary symbols of said plurality are associated with Zadoff-Chu sequences having distinct frequency offsets, each K-ary symbol being modulated in the form of a sequence, of length greater than or equal to $2^K$, of consecutive complex elements of the Zadoff-Chu sequence associated with said K-ary symbol, wherein the distinct frequency offsets for the Zadoff-Chu sequence are assigned distinctively for two communications.

2. The modulation method according to claim 1, wherein the sequence of consecutive complex elements consists of all the elements of said Zadoff-Chu sequence.

3. The modulation method according to claim 2, wherein the length of the Zadoff-Chu sequence is equal to a power of 2.

4. The modulation method according to claim 1, wherein the length of said Zadoff-Chu sequence is chosen equal to the smallest prime number greater than $2^K$ and that the sequence of consecutive complex elements is obtained by truncating said Zadoff-Chu sequence to $2^K$ elements.

5. The modulation method according to claim 1, wherein the length of the Zadoff-Chu sequence is chosen greater than the difference between a maximum frequency offset to modulate the K-ary symbols and the time spread of the transmission channel, expressed in number of transmission periods of elements of that sequence.

6. The modulation method according to claim 1, wherein the real part and the imaginary part of the elements of the sequence of consecutive complex elements of a Zadoff-Chu sequence associated with a K-ary symbol respectively modulate two quadrature carriers and that the modulated signal thus obtained is transmitted over the transmission channel.

7. The modulation method according to claim 1, wherein a phase signal is generated in baseband, obtained as the phase of the consecutive complex elements of the Zadoff-Chu sequence associated with a K-ary symbol, and that the phase signal is translated into RF-band, the RF signal thus obtained being transmitted over the transmission channel.

8. A method for transmitting data over a plurality of communications to or from different users, wherein the data to be transmitted are transformed into K-ary symbols, the K-ary symbols of the different users being modulated by means of the modulation method according to claim 1, the roots of the Zadoff-Chu sequences used to modulate the K-ary symbols of two distinct users being chosen distinct and their lengths chosen equal to a common length.

9. The data transmission method according to claim 8, wherein the roots used to modulate the K-ary symbols of two distinct users are chosen such that the absolute value of their difference is prime to said common length.

10. The device for demodulating a signal representing a Zadoff-Chu sequence modulated in frequency offset by means of a modulation method according to claim 1, said signal is baseband sampled to provide a first block of complex elements of size N, the device comprising a cyclic correlator of size N for cyclically correlating said first block with a second block, said second block consisting of a reference Zadoff-Chu sequence, a modulus calculator calculating the modulus of said cyclic correlation and a correlation peak detector determining, from this modulus, the time position of a cyclic correlation peak and deducing a frequency offset $\hat{q}$ corresponding to said time position therefrom, said frequency offset being provided to a decimal to binary converter to generate a K-ary symbol.

11. A modulation device to modulate a plurality of K-ary symbols to be transmitted over a transmission channel, comprising a binary to decimal converter transforming the bits K of each K-ary symbol into a distinct integer value, and a Zadoff-Chu sequence generator, having as input parameters a sequence length N and a root r such as integer r, r>1 and prime to N, as well as a frequency offset q, q being a relative integer, said generator generating, for each K-ary symbol, a sequence having a length greater than or equal to $2^K$, formed by complex elements of a Zadoff-Chu sequence of length N, root r and frequency offset equal to the integer value provided by said binary to decimal converter, said Zadoff-Chu sequence generator being configured so that any two K-ary symbols of said plurality are associated with Zadoff-Chu sequences having distinct frequency offsets, wherein the distinct frequency offsets for the Zadoff-Chu sequence are assigned distinctively for two communications.

12. A method for demodulating a signal representing a Zadoff-Chu sequence modulated in frequency offset by means of a modulation method according to claim 1, wherein said signal is baseband sampled to provide a sequence of complex samples, that said sequence of complex samples is correlated by cyclic correlation with a reference Zadoff-Chu sequence to provide a cyclic correlation result and that the time position of a correlation peak in the modulus of the cyclic correlation result thus obtained is detected, and that a frequency offset is deduced therefrom, $\hat{q}$ corresponding to this time position, said frequency offset being then converted by a decimal to binary converter into an K-ary symbol.

13. A device for demodulating a signal representing a Zadoff-Chu sequence modulated in frequency offset by means of a modulation method according to claim 1, said signal is baseband sampled to provide a first block of complex elements of size N, wherein said device comprises a DFT module configured to perform discrete Fourier transform of size N of the first block of complex elements to provide a first block of complex frequency elements, a multiplier for multiplying term by term the complex frequency elements of the first block with the complex frequency elements of a second block obtained by complex conjugation of a discrete Fourier transform of a reference Zadoff-Chu sequence, a modulus calculator for calculating the modulus of the multiplication results of the first and second complex frequency elements, the modulus values thus obtained being compared in a correlation peak detector to determine the frequency position of a cyclic correlation peak, and that the frequency offset, $\hat{q}$, corresponding to that frequency position is deduced, said frequency offset being provided to a decimal to binary converter to generate an K-ary symbol.

14. A transmitter/receiver comprising at least one modulation device according to claim 11 and at least one demodulation device.

15. The transmitter/receiver according to claim 14, wherein said at least one modulation device comprises a plurality of modulation devices, each modulation device of said plurality corresponding to a different root value, and/or a plurality of demodulation devices, each demodulation device of said plurality corresponding to a different root value.

* * * * *